(12) United States Patent
Estlick et al.

(10) Patent No.: US 12,204,935 B2
(45) Date of Patent: Jan. 21, 2025

(54) THREAD FORWARD PROGRESS AND/OR QUALITY OF SERVICE

(71) Applicant: Advanced Micro Devices, Inc., Santa Clara, CA (US)

(72) Inventors: Michael Estlick, Fort Collins, CO (US); Erik Swanson, Fort Collins, CO (US); Eric Dixon, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 424 days.

(21) Appl. No.: 17/390,149

(22) Filed: Jul. 30, 2021

(65) Prior Publication Data

US 2023/0034933 A1 Feb. 2, 2023

(51) Int. Cl.
*G06F 9/48* (2006.01)
*G06F 9/38* (2018.01)

(52) U.S. Cl.
CPC .......... *G06F 9/4881* (2013.01); *G06F 9/3818* (2013.01); *G06F 9/384* (2013.01); *G06F 9/3851* (2013.01)

(58) Field of Classification Search
CPC ...... G06F 9/4881; G06F 9/3818; G06F 9/384; G06F 9/3851
See application file for complete search history.

(56) References Cited

U.S. PATENT DOCUMENTS

| | | | |
|---|---|---|---|
| 2014/0181827 A1* | 6/2014 | Dice | G06F 9/4881 718/103 |
| 2017/0315806 A1* | 11/2017 | Mazumdar | G06F 9/30094 |
| 2020/0387624 A1* | 12/2020 | Dunjic | G06F 21/604 |
| 2023/0050383 A1* | 2/2023 | Brewer | G06F 9/38 |
| 2023/0056665 A1* | 2/2023 | Estep | G06F 15/7825 |
| 2023/0325194 A1* | 10/2023 | Zaidi | G06F 9/4843 712/208 |

* cited by examiner

*Primary Examiner* — Sisley N Kim (57) ABSTRACT

Methods, systems, and apparatuses provide support for allowing thread forward progress in a processing system and that improves quality of service. One system includes a processor; a bus coupled to the processor; a memory coupled to the processor via the bus; and a floating point unit coupled to the processor via the bus, wherein floating point unit comprises hardware control logic operative to: store for each thread, by a scheduler of the floating point unit, a counter; increase, by the scheduler, a value of the counter for each thread corresponding to a thread when at least one source ready operation exist for the thread; compare, by the scheduler, the value of the counter to a predetermined threshold; and make other threads ineligible to be picked by the scheduler when the counter is greater than or equal to the predetermined threshold.

21 Claims, 5 Drawing Sheets

THREAD FORWARD PROGRESS AND/OR QUALITY OF SERVICE

BACKGROUND OF THE DISCLOSURE

Processing systems include one or more coprocessors, such as floating-point units (FPUs), to supplement one or more functions of a primary processor, such as a central processing unit (CPU). For example, an FPU executes mathematical operations, such as addition, subtraction, multiplication, division, and/or other floating-point instructions including transcendental operations, bitwise operations, etc. Today, superscalar processors achieve higher performance by executing multiple instructions concurrently and out-of-order. That is, instructions are processed out of the order that the instructions were placed into an execution unit. Simultaneous multithreading (SMT) is a technique for improving the overall efficiency of superscalar processors with hardware multi-threading. SMT permits multiple independent threads of execution to better utilize resources of processors and coprocessors. Notwithstanding out-of-order processing, certain threads monopolize coprocessor and/or processor resources, which causes unfairness and/or forward progress issues for the other threads. This practice is wasteful of resources since other threads are held until the thread monopolizing the resources completes.

BRIEF DESCRIPTION OF THE DRAWINGS

The implementations will be more readily understood in view of the following description when accompanied by the below figures, wherein like reference numerals represent like elements, and wherein.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate implementations using suitable forms of indirect electrical connection as well.

DETAILED DESCRIPTION OF IMPLEMENTATIONS AND EMBODIMENTS

One skilled in the art will recognize that various implementations and embodiments of the present disclosure is practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but includes other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) are not be described in detail herein. Furthermore, the connecting lines shown in the various figures contained herein are intended to represent exemplary functional relationships and/or physical couplings between the various elements. It should be noted that many alternative and/or additional functional relationships or physical connections are present in an implementation of the subject matter.

Reference will now be made in detail to the exemplary implementations of the disclosure, examples of which are illustrated in the accompanying drawings. Wherever possible, the same reference numbers will be used throughout the drawings to refer to the same or like parts.

The present disclosure generally relates to, among other things, methods, systems, and apparatuses that promote thread forward progress and improved thread quality of service. The methods, systems, and apparatuses disclosed herein use source ready threads, counters, and eligibility blocking to achieve performance and thread fairness. Additionally, while there are long latency operations in pipelines, i.e., execution units, and many hazards in a register file, instructions are looked at in a scheduler and problem causing threads are blocked to allow other threads to execute in a fair manner.

Figure 1:
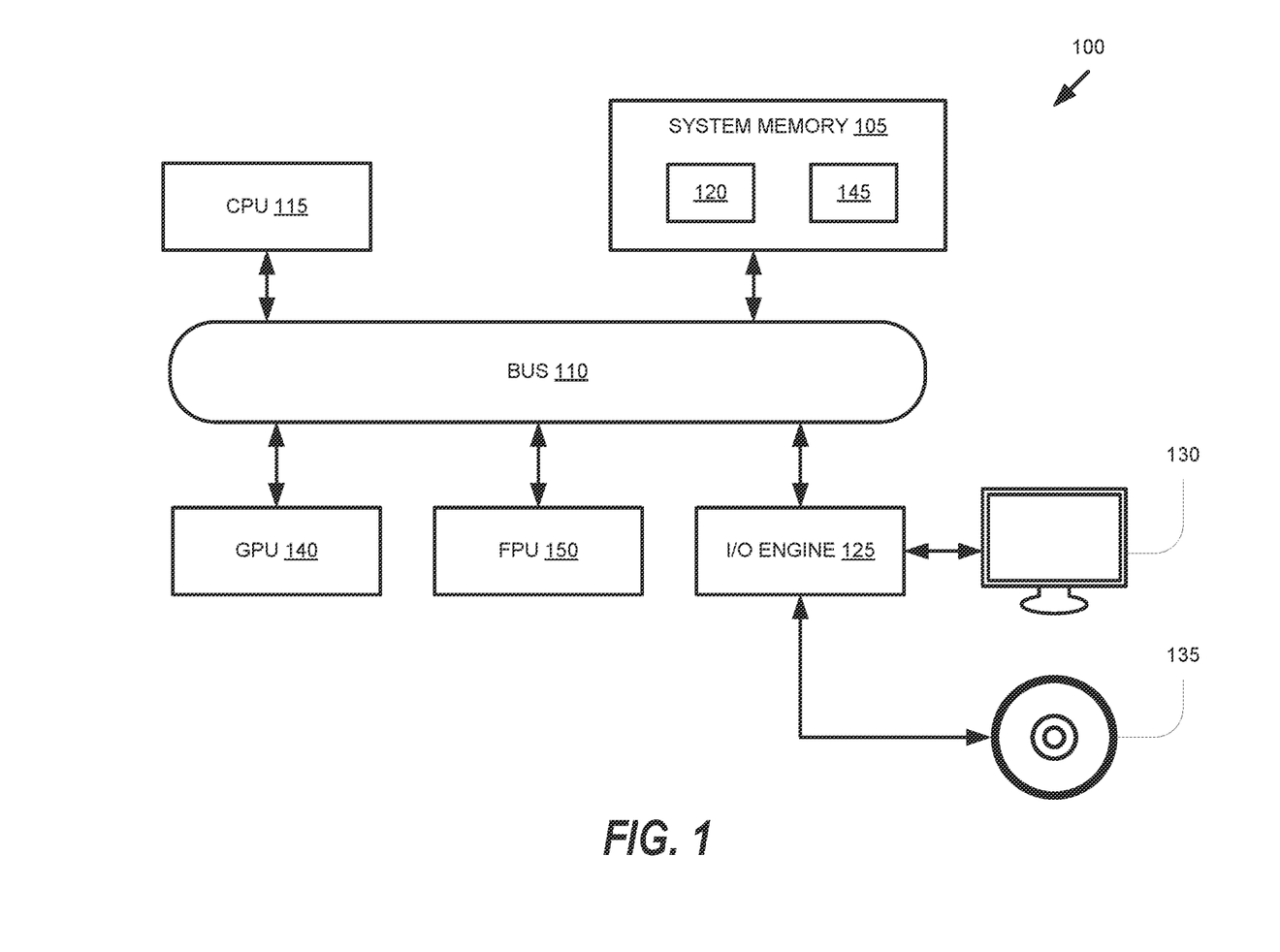
FIG. 1 depicts an exemplary block diagram of a processing system, according to implementations of the present disclosure.

FIG. 1 depicts an exemplary block diagram of a processing system 100, according to implementations of the present disclosure. The processing system 100 includes or has access to a memory 105 or other storage component that is implemented using a non-transitory computer readable medium, such as a dynamic random access memory (DRAM). Additionally, and/or alternatively, the memory 105 is implemented using other types of memory including static random access memory (SRAM), nonvolatile RAM, spin torque RAM (STRAM), etc. The memory 105 is an external memory and is implemented external to processing units implemented in the processing system 100. The processing system 100 also includes a bus 110 to support communication between entities implemented in the processing system 100, such as the memory 105. In implementations of the present disclosure, the processing system 100 includes other buses, bridges, switches, routers, etc.

The processing system 100 includes a graphics processing unit (GPU) 115 that is configured to render images for presentation on a display 120. For example, the GPU 115 renders objects to produce values of pixels that are provided to the display 120, which uses the pixel values to display an image that represents the rendered objects. In implementations of the present disclosure, the GPU 115 is used for general purpose computing. The GPU 115 executes instructions, such as program code 125 stored in the memory 105 and the GPU 115 stores information in the memory 105, such as the results of the executed instructions.

The processing system 100 includes at least one central processing unit (CPU) 130 that is connected to the bus 110. The CPU 130 communicates with the GPU 115 and the memory 105 via the bus 110. The CPU 130 executes instructions, such as program code 135, stored in the memory 105, and the CPU 130 stores information in the memory 105, such as the results of the executed instructions. CPU 130 is able to initiate graphics processing by issuing commands to the GPU 115.

The processing system 100 further includes one or more co-processing units, such as a floating-point unit (FPU) 140. FPU 140 is configured to carry out operations on floating point numbers. In implementations of the present disclosure, the FPU 140 performs operations including addition, subtraction, multiplication, division, square root, and bit shifting or broadcasting, as well as transcendental functions such as exponential functions, trigonometric functions, and the like. The FPU 140 supports operation of the GPU 115 and the CPU 130. For example, if the CPU 130 encounters an instruction that requires performing a floating-point operation, the CPU 130 transmits a request to the FPU 140, which carries out the operation and returns the results to the CPU 130. Although the FPU 140 shown in FIG. 1 is implemented externally to the GPU 115 and the CPU 130, in implementations of the present disclosure, the FPU 140 is integrated into one or more other processing units.

The FPU 140 is configured to operate on instructions that include a relatively large number of bits, e.g., on 512 bit instructions and/or 256 bit instructions. In implementations of the present disclosure, the coprocessor, such as FPU 140, supports native 512 bit and/or 256 bit instructions and is frequently called upon to execute instructions that only utilize 128 bits of the 256 available bits or 255 bits of the 512 available bits, such as instructions from 128 bit instruction set architectures. Physical devices, such as transistors, are used to implement lanes of one or more pipelines that process the instructions in the FPU 140. A controller in the FPU 140 is configured to provide control signals to the pipelines. A scheduler in the FPU 140 is configured to provide a set or a subset of bits of the instruction to the pipeline.

An input/output (I/O) engine 145 handles input and/or output operations associated with the display 120, as well as other elements of the processing system 100, such as keyboards, mice, printers, external disks, and the like. The I/O engine 145 is coupled to the bus 110 so that the I/O engine 145 is able to communicate with the memory 105, the GPU 115, and/or the CPU 130. In implementations of the present disclosure, the I/O engine 145 is configured to read information stored on an external storage device 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

Figure 2:
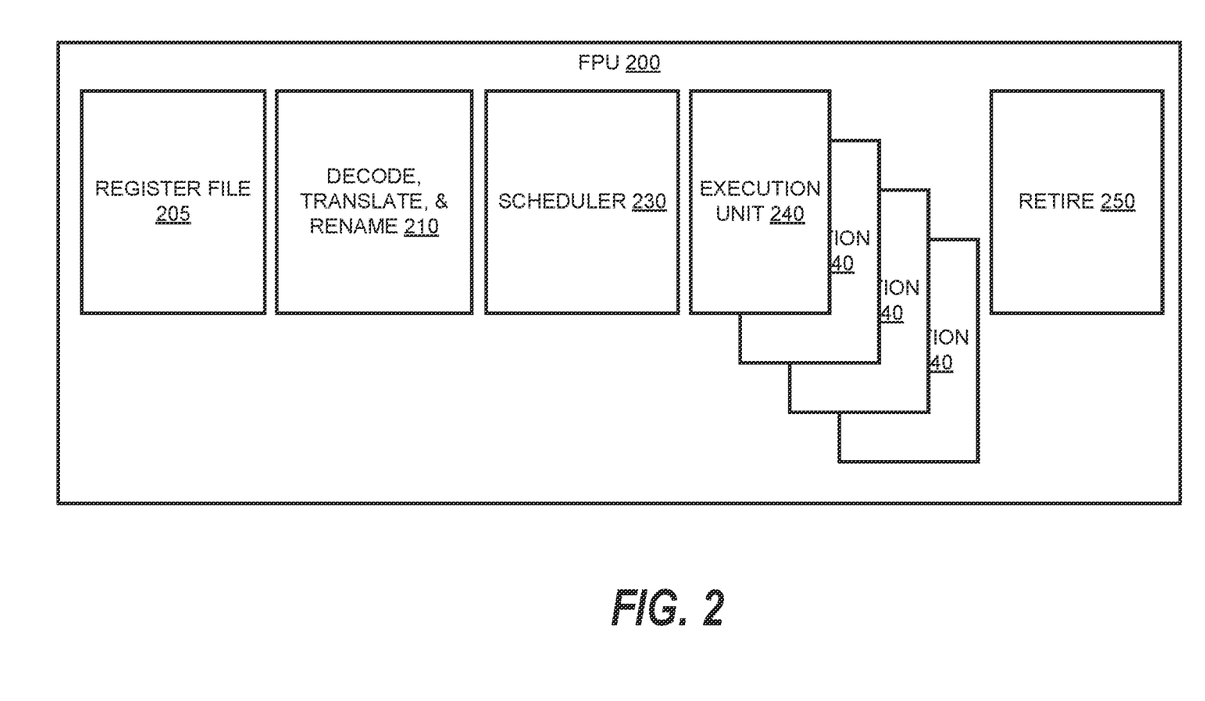
FIG. 2 depicts a block diagram of an FPU, according to implementations of the present disclosure.

FIG. 2 depicts a block diagram of an FPU, according to implementations of the present disclosure. The FPU 200 is used to implement some implementations of the FPU 140, as shown in FIG. 1. The FPU 200 includes a register file 205, which is used to store instructions, operands used by the instructions, and results of executed instructions. Entries in the register file 205 are indicated by register numbers. In implementations of the present disclosure, the register numbers are mapped (or renamed) to architectural register numbers that are defined by an instruction set architecture. For example, register file 205 stores 512 bit instructions, and the register file 205 is a circuit structure that includes 256 bit wide register with a shadow register of 256 bit.

A decode, translate, and rename block 210 receives instructions that are to be executed by the FPU 200. The decode, translate, and rename block 210 is configured to decode the instructions, perform address translations, and perform register renaming for instructions, as necessary. The decode, translate, and rename block 210 is also connected to a retire unit 250 that stores instructions until they are retired.

A scheduler 230 is configured to schedule instructions for execution in the FPU 200. The decode, translate, and rename block 210 provides decoded instructions to the scheduler 230. The scheduler 230 stores pending instructions until their operands are available in the register file 205. For example, the scheduler 230 stores the pending instructions until they are eligible to be selected by the scheduler to issue to one of the execution units. The scheduler 230 includes a scheduler queue and associated issue logic. The schedule 230 determines which opcodes are passed to the execution units and in what order.

The FPU 200 includes a plurality of execution units 240 that is configured to execute floating-point instructions that the scheduler 230 dispatches from the register file 205 to at least one execution unit of the plurality of execution units 240. For example, the plurality of execution units 240 are each able to execute a 512 bit and/or a 256 bit floating-point instruction that is received from the register file 205. Results of the instructions that are executed by the plurality of execution units 240 are returned to the register file 205. The plurality of execution units 240 process instructions in multiple stages (not shown) that include reading instructions, decoding instructions, executing instructions, and writing of results back to the register file 205. Four (4) execution units 240 are shown in FIG. 2, but FPU 240 additionally and/or alternatively comprises more or less execution units.

In implementations of the present disclosure, after instructions have been executed, the instructions are retired so that the state of the FPU 200 is updated with a self-consistent, non-speculative architected state consistent with execution of a program. The register file 205 and/or a retire unit 250 maintains a list of retired instructions.

The processing system 100 includes symmetric multi-threaded features, where a same core processes two or more threads. Thus, a single scheduler, such as scheduler 230, is a multi-threaded scheduler that is used by a plurality of execution units. When there are a plurality of execution units that process two or more threads at the same time, there are multiple types of hazards, which occurs when two or more execution units try to use the same resource at the same time. A symmetric multi-threaded (SMT) scheduler, such as scheduler 230, picks a thread that is the oldest, source ready, and hazard free thread to execute. However, this thread potentially takes most and/or all of certain shared resources, which causes unfairness to other threads and slow forward progress of other threads, as hazards have to resolve themselves, and not all threads will be treated in a fair way.

Figure 3:
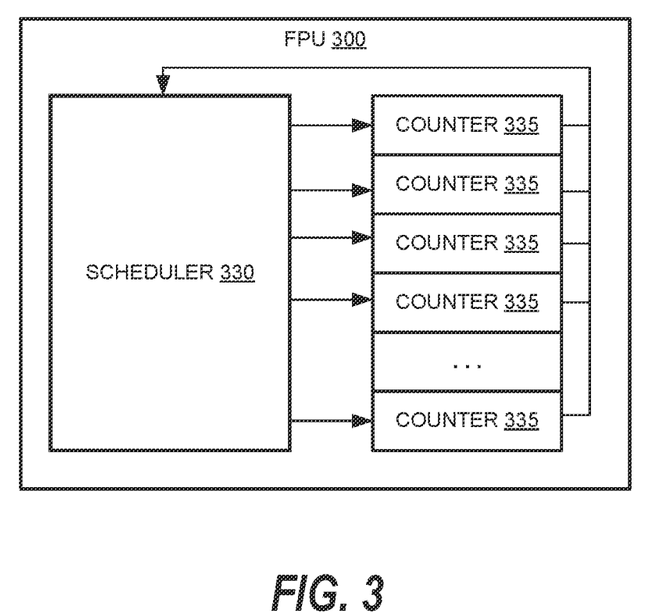
FIG. 3 depicts a block diagram of an FPU having a scheduler and a plurality of counters, according to implementations of the present disclosure.

Thus, in order to support thread forward progress, a scheduler includes a plurality of counters, where a number of counters is at least one for each thread. FIG. 3 depicts a block diagram of an FPU having a scheduler and a plurality of counters, according to implementations of the present disclosure. The FPU 300 is used to implement some implementations of the FPU 140, as shown in FIG. 1, and FPU 200, as shown in FIG. 2. Additionally, the scheduler 330 is used to implement some implementations of the scheduler 230, as shown in FIG. 2. Other parts of FPU 300, such as a register file, decode, translate and rename unit, execution units, and retirement unit, are omitted from the drawings for clarity purposes and one or more of these units is present in implementations of the present disclosure.

The scheduler 330 includes a plurality of counters 335, where a number of counters is at least one for each thread. A value of each counter 335 increases/counts up when source ready operations exist for a thread corresponding to the counter. The plurality of counters 335 includes circuitry near and/or within the scheduler 330. A value of the counter clears when the thread corresponding to the counter is picked by the scheduler 330. If a value of a counter of the plurality of counters 335 is equal to or greater than a predetermined threshold, other threads is made ineligible to be picked by the scheduler 330 until the thread corresponding to the counter that has a value that is equal to or greater than the predetermined threshold is picked. Even though the value of the counter increases/counts up when the source ready operations exist for the thread corresponding to the counter, the thread has to wait for hazards to resolve prior to execution. This allows for the scheduler 330 not to have to understand all of the hazards and cross thread interactions, and provides a back stop for safety.

Certain hazards that a thread has to wait for to clear include port sharing hazards, shadow select sharing hazards, data path resource sharing hazards, etc. A port sharing hazard includes, for example, when two execution units share a register file read port. For each thread having a hazard where a register file read port is shared and when the thread that has source ready operations that want the shared port, the value of the counter corresponding to each thread is increased. When a thread is able to use the shared point, the value of the counter is reset. However, if the value of the counter corresponding to a thread with the port sharing hazard is equal to or greater than a predetermined threshold, the scheduler stops other threads from using the shared port until the thread corresponding to the value of the counter that is equal to or greater than the predetermined threshold is able to use the shared port.

A shadow select sharing hazard includes, for example, when two execution units share a shadow select for register file reads. A shadow select is used to get upper 256 bits of a 512 bit register. For each thread having a hazard where a shadow select for register file reads is shared and when the thread that has a source ready 512-bit operation that needs to use the shadow select, the value of the counter corresponding to each thread is increased. When a thread is able to use the shadow select to do a 512-bit operation, the value of the counter is reset. However, if the value of the counter corresponding to a thread with the shadow select sharing hazard is equal to or greater than a predetermined threshold, the scheduler stops other threads from using the shadow select (i.e., inhibiting 512-bit operations on that shared shadow select) until the thread corresponding to the value of the counter that is equal to or greater than the predetermined threshold is able to pick a 512-bit operation that uses the shadow select.

A data path resource sharing hazard includes, for example, when two execution units share an arithmetic data path, such as a divide unit. For each thread having a hazard where a source ready divide operation or other expensive or less commonly used data path is picked, the value of the counter corresponding to each thread is increased. When a thread is able to pick a divide operation or other expensive or less commonly used data path, the value of the counter is reset. However, if the value of the counter corresponding to a thread with the data path resource sharing hazard is equal to or greater than a predetermined threshold, the scheduler stops other threads from picking the divide operation or other expensive or less commonly used data path until the thread corresponding to the value of the counter that is equal to or greater than the predetermined threshold is able to pick the divide operation or other expensive or less commonly used data path.

If a plurality of counters corresponding to a corresponding plurality of threads have values that are equal to or greater than the predetermined threshold, each thread having a corresponding value of the counter equal to or greater than the predetermined threshold is allowed to make other threads ineligible to be picked by the scheduler 330. In order, a thread having a corresponding value of the counter equal to or greater than the predetermined threshold is allowed to make other threads ineligible to be picked by the scheduler 330, and then a next thread having a corresponding value of the counter equal to or greater than the predetermined threshold is allowed to make other threads ineligible to be picked by the scheduler 330. Then, the scheduler services a further next thread having a corresponding value of the counter equal to or greater than the predetermined threshold. The order of processing threads having a corresponding value of the counter equal to or greater than the predetermined threshold by the scheduler 330 is based on a time in which the counter became equal to or greater than the predetermined threshold and/or a preset priority between threads.

Additionally, and/or alternatively, different predetermined thresholds are set for different threads. The different predetermined threshold is based on an importance of thread or is based on priorities set by users for different threads. For example, a thread that relates to a window that is in the foreground has a highest priority, and thus, a predetermined threshold for this counter is lower than other predetermined thresholds for counters corresponding to other threads. Additionally, a thread that relates to a window that is in the background is less important, and thus, a predetermined threshold for this counter is higher than other predetermined thresholds for counters corresponding to other threads.

Figure 4:
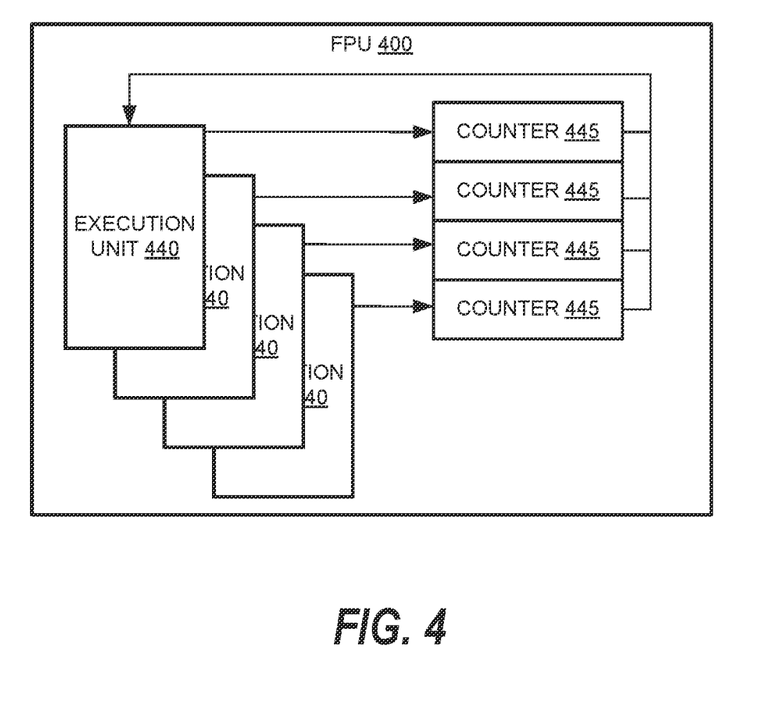
FIG. 4 depicts a block diagram of an FPU having a plurality of execution units and a plurality of counters, according to implementations of the present disclosure.

Implementations of the present disclosure allow for execution unit fairness, such as fairness amongst the plurality of execution units 240. FIG. 4 depicts a block diagram of an FPU having a plurality of execution units and a plurality of counters, according to implementations of the present disclosure. The FPU 400 is used to implement some implementations of the FPU 140, as shown in FIG. 1, FPU 200, as shown in FIG. 2, and FPU 300, as shown in FIG. 3. Additionally, the plurality of execution units 440 is used to implement some implementations of the scheduler the plurality of execution units 240, as shown in FIG. 2. Other parts of FPU 400, such as a register file, decode, translate and rename unit, scheduler, and retirement unit, are omitted from the drawings for clarity purposes and one or more of these units is present in implementations of the present disclosure. Four (4) execution units 440 are shown in FIG. 4, but FPU 440 additionally and/or alternatively comprises more or less execution units.

The plurality of execution units 440 includes a plurality of counters 445, where a number of counters is at least one for each thread for each execution unit 440. A value of each counter 445 is increased/counts up when source ready operations is assigned to a particular corresponding execution unit for a thread. The plurality of counters 445 includes circuitry near and/or within the plurality of execution units 440. A value of a counter clears when the thread executes on the particular corresponding execution unit. If a counter of the plurality of counters 445 have values that are equal to or greater than a predetermined threshold, other threads are made ineligible to execute on the particular corresponding execution unit until the thread is able to execute on the particular corresponding execution unit. Even though the value of the counter increases/counts up when the source ready operations is assigned to a particular corresponding execution unit for a thread, the thread has to wait for hazards to resolve prior to execution. This allows for the execution unit to not to have to understand all of the hazards and cross thread interactions, and provides a back stop for safety. Additionally, and/or alternatively, different predetermined thresholds is set for different execution units. The different predetermined thresholds are based on an importance of the execution unit.

Referring back to FIG. 3, the scheduler 330 includes a plurality of counters 335, where a number of counters is at least one for each hazard for each thread. A value of each counter 335 is increased/counts up when a particular hazard is hit and the scheduler does not pick the thread and when source ready operations exist for the thread. In this implementation, the plurality of counters 335 includes circuitry near and/or within the scheduler 330. A value of a counter clears when the thread corresponding to the counter is picked by the scheduler 330, which requires the hazard to be cleared. If a counter of the plurality of counters 335 has a value equal to or greater than a predetermined threshold, other threads is blocked by the scheduler 330 until the thread corresponding to the counter that has a value that is equal to or greater than the predetermined threshold is picked. This allows for the scheduler 330 to block other threads activity that could cause the hazard.

Figure 5:
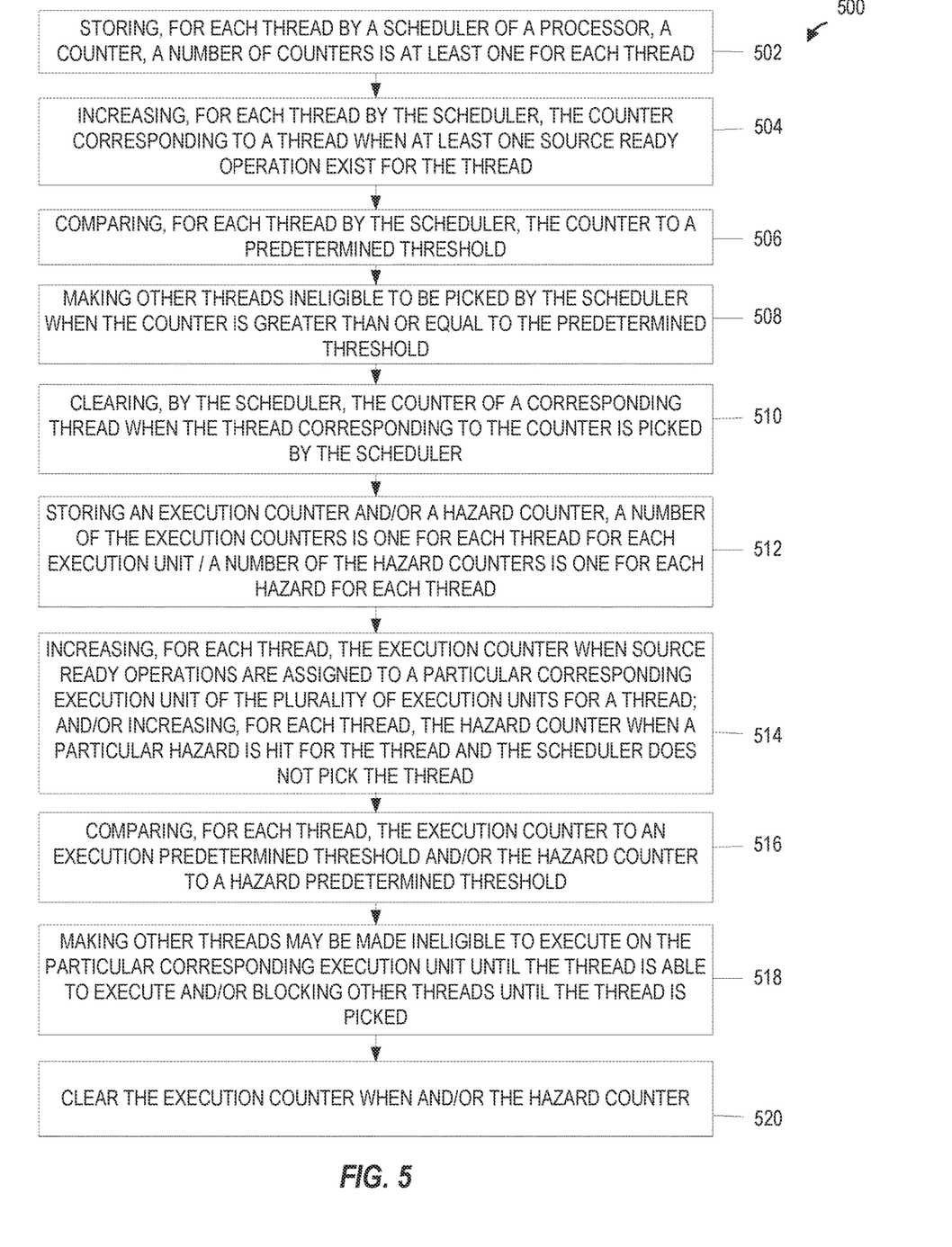
FIG. 5 is a flowchart illustrating a method for providing thread forward progress, according to implementations of the present disclosure.

FIG. 5 is a flowchart illustrating a method for providing thread forward progress, according to implementations of the present disclosure. The operations are performed in any suitable order. As shown in FIG. 5, the method 500 includes step 502 for storing, by a scheduler of a processor, at least one counter for each thread, a number of counters is at least one for each thread, such as by the counters 335 of scheduler 330 and/or scheduler 230. Each of the plurality of counters is used to count a thread that is source ready, but not necessarily hazard free, as discussed above. The processor is a floating point unit (FPU), such as one of FPU 150, 200, 300, or 400 that carries out operations on floating point numbers, and the scheduler is a symmetric multi-threaded (SMT) scheduler that picks an oldest thread where the at least one source ready operation exist for the oldest thread. The scheduler stores pending instructions until operands are available in a register file, such as register file 205, of the processor, and the scheduler stores the pending instructions until the pending instructions are eligible to be selected by the scheduler to issue to an execution unit of the plurality of execution units, such as execution units 240 and 440.

As shown in FIG. 5, the method 500 includes step 504 for increasing, by the scheduler, the value of the counter for each thread corresponding to a thread when at least one source ready operation exist for the thread. As explained above, a value of each counter is increased/counts up when source ready operations exist for a thread corresponding to the counter. The plurality of counters includes circuitry near and/or within the scheduler. Further, the value of the counter increases when the thread waits for at least one hazard to resolve prior to execution, and the least one hazard includes one or more of a port sharing hazard, a shadow select sharing hazard, and a data path resource sharing hazard.

As explained in more detail above, a port sharing hazard includes when two execution units of a plurality of execution units share a register file read port, and when the value of the counter corresponding to a thread with the port sharing hazard is equal to or greater than the predetermined threshold, the scheduler stops other threads from using the shared port until the thread corresponding to the counter that has a value that is equal to or greater than the predetermined threshold is able to use the shared port. A shadow select sharing hazard includes when two execution units of a plurality of execution units share a shadow select for register file reads, and when the value of the counter corresponding to a thread with the shadow select sharing hazard is equal to or greater than the predetermined threshold, the scheduler stops other threads from using the shadow select until the thread corresponding to the counter that has a value that is equal to or greater than the predetermined threshold is able to pick an operation that uses the shadow select. A data path resource sharing hazard includes when two execution units of a plurality of execution units share an arithmetic data path, and when the value of the counter corresponding to a thread with the data path resource sharing hazard is equal to or greater than the predetermined threshold, the scheduler stops other threads from picking a shared arithmetic data path operation until the thread corresponding to the counter that has a value that is equal to or greater than the predetermined threshold is able to pick the shared arithmetic data path operation.

As shown in block 506, the method 500 includes comparing, by the scheduler, the value of the counter for each thread to a predetermined threshold. Then, at block 508, the method 500 includes making other threads ineligible to be picked by the scheduler when the value of the counter is greater than or equal to the predetermined threshold. If a plurality of counters corresponding to a corresponding plurality of threads have values that are equal to or greater than the predetermined threshold, each thread having a corresponding value of the counter equal to or greater than the predetermined threshold is allowed to make other threads ineligible to be picked by the scheduler. In order, a thread having a corresponding value of the counter equal to or greater than the predetermined threshold is allowed to make other threads ineligible to be picked by the scheduler, and then a next thread having a corresponding value of the counter equal to or greater than the predetermined threshold is allowed to make other threads ineligible to be picked by the scheduler. Then, the scheduler services a further next thread having a corresponding value of the counter equal to or greater than the predetermined threshold. The order of processing threads having a corresponding value of the counter equal to or greater than the predetermined threshold by the scheduler is based on a time in which the counter became equal to or greater than the predetermined threshold and/or a preset priority between threads. Moreover, each thread additionally and/or alternatively has a different predetermined threshold, and the different predetermined thresholds are based on an importance of thread, such that a more important thread has a lower threshold than a less important thread that has a higher threshold.

The method 500 also includes step 510 for clearing, by the scheduler, the value of the counter of a corresponding thread when the thread corresponding to the counter is picked by the scheduler. As the corresponding thread has been scheduled to be executed by an execution unit of the plurality of execution units, the value of the counter is cleared to allow other threads to use processing resources.

The method 500 also includes step 512 for storing, for each execution unit of a plurality of execution units of the processor, an execution counter, a number of the execution counters is a least one for each thread for each execution unit, and/or stores, for each thread of a plurality of threads, a hazard counter, a number of the hazard counters is at least one for each hazard for each thread. Then, at step 514, the method 500 increases, for each thread, a value of the execution counter when source ready operations are assigned to a particular corresponding execution unit of the plurality of execution units for a thread; and/or increases, for each thread, a value of the hazard counter when a particular hazard is hit for the thread and the scheduler does not pick the thread.

Next, at step 516, the method compares, for each thread, the value of the execution counter to an execution predetermined threshold, and/or compares, for each thread, the value of the hazard counter to a hazard predetermined threshold. Depending on which counter is being processed, the method at step 518 makes other threads is made ineligible to execute on the particular corresponding execution unit until the thread is able to execute on the particular corresponding execution unit when the execution counter having a value that is greater than or equal to the execution predetermined threshold, and/or blocks, by the scheduler, other threadsuntil the thread corresponding to the hazard counter having a value that is equal to or greater than the hazard predetermined threshold is picked. Finally, at step 520, the method clears the value of the execution counter when the thread executes on the particular corresponding execution unit, and/or clears the value of the hazard counter when the thread is picked by the scheduler.

As described above, the disclosure relates to methods, systems, and apparatuses that promote thread forward progress and improved thread quality of service. The methods, systems, and apparatuses disclosed herein use source ready threads, counters, and eligibility blocking to achieve performance and thread fairness. Additionally, while there is long latency operations in pipelines, i.e., execution units, and many hazards in a register file, instructions are looked at in a scheduler and problem causing threads are blocked to allow other threads to execute in a fair manner.

Thread forward progress and improved thread quality of service are detectable by analysis of a register file. Micro benchmarks are prepared to detect forward progress/fairness/quality issues. A thread is programmed to hog and/or monopolize resources of an FPU, and another thread is used to detect the execution of the another thread. When the FPU is not processing threads in a fair manner, the one thread programmed to monopolize resources will only be detected at the execution unit. However, if the another thread is detected and completed, then the scheduler would be allowing for thread forward progress. Moreover, a review of the a processor's interconnects could show whether there are a number of counters per thread.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various implementations, reference has been made to the accompanying drawings which form a part thereof, and in which is shown by way of illustration specific preferred implementations in which the invention is practiced. These implementations are described in sufficient detail to enable those skilled in the art to practice the invention, and it is to be understood that other implementations is utilized, and that logical, mechanical and electrical changes is made without departing from the scope of the invention. To avoid detail not necessary to enable those skilled in the art to practice the invention, the description are omit certain information known to those skilled in the art. Furthermore, many other varied implementations that incorporate the teachings of the disclosure is easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the implementations and the examples described therein have been presented for the purposes of illustration and description only and not by limitation. For example, the operations described are done in any suitable order or manner. Itis therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method for providing thread forward progress, the method comprising:
    storing for each thread, by a scheduler of a processor, at least one counter;
    increasing, by the scheduler, a value of the at least one counter for each thread that has at least one source ready operation exist for a thread;
    comparing, by the scheduler, the value of the at least one counter for each thread to a predetermined threshold; and
    making other threads ineligible to be picked by the scheduler when the value of the at least one counter of a thread is greater than or equal to the predetermined threshold.

2. The method according to claim 1, wherein the processor is a floating point unit that carries out operations on floating point numbers, and the scheduler is a symmetric multi-threaded (SMT) scheduler that picks an oldest thread where the at least one source ready operation exist for the oldest thread.

3. The method according to claim 1, wherein the scheduler stores pending instructions until operands are available in a register file of the processor, and
    wherein the scheduler stores the pending instructions until the pending instructions are eligible to be selected by the scheduler to issue to an execution unit of a plurality of execution units.

4. The method according to claim 1, further comprising:
clearing, by the scheduler, the value of the at least one counter of a corresponding thread when the corresponding thread is picked by the scheduler.

5. The method according to claim 1, wherein the value of the at least one counter increases when the thread waits for at least one hazard to resolve prior to execution, and the least one hazard includes one or more of a port sharing hazard, a shadow select sharing hazard, and a data path resource sharing hazard.

6. The method according to claim 5, wherein the port sharing hazard includes when two execution units of a plurality of execution units share a register file read port, and
wherein when the value of the at least one counter corresponding to a thread with the port sharing hazard is equal to or greater than the predetermined threshold, the scheduler stops other threads from using the shared register file read port until the thread is able to use the shared register file read port.

7. The method according to claim 5, wherein the shadow select sharing hazard includes when two execution units of a plurality of execution units share a shadow select for register file reads, and
wherein when value of the counter corresponding to a thread with the shadow select sharing hazard is equal to or greater than the predetermined threshold, the scheduler stops other threads from using the shadow select until the thread is able to pick an operation that uses the shadow select.

8. The method according to claim 5, wherein the data path resource sharing hazard includes when two execution units of a plurality of execution units share an arithmetic data path, and
wherein when the value of the at least one counter corresponding to a thread with the data path resource sharing hazard is equal to or greater than the predetermined threshold, the scheduler stops other threads from picking a shared arithmetic data path operation until the thread is able to pick the shared arithmetic data path operation.

9. The method according to claim 1, wherein when a plurality of counters, each counter corresponding to a corresponding thread of a plurality of threads, have a value that is equal to or greater than the predetermined threshold, each thread having a corresponding value of the counter equal to or greater than the predetermined threshold, the scheduler makes other threads ineligible to be picked by the scheduler, and
wherein the scheduler processes the threads having a corresponding value of the counter equal to or greater than the predetermined threshold based on one of i) a time in which the counter became equal to or greater than the predetermined threshold and ii) a preset priority between threads.

10. The method according to claim 1, wherein each thread has a different predetermined threshold, the different predetermined thresholds based on an importance of thread, and
wherein a more important thread has a lower threshold than a less important thread that has a higher threshold.

11. The method according to claim 1, further comprising:
storing, for each execution unit of a plurality of execution units of the processor, an execution counter, a number of execution counters is one for each thread for each execution unit;
increasing, for each thread, a value of the execution counter when source ready operations are assigned to a particular corresponding execution unit of the plurality of execution units for a thread;
comparing, for each thread, the value of the execution counter to an execution predetermined threshold; and
making other threads is made ineligible to execute on the particular corresponding execution unit until the thread is able to execute on the particular corresponding execution unit when the value of the execution counter is greater than or equal to the execution predetermined threshold.

12. The method according to claim 11, further comprising:
clearing the value of the execution counter when the thread executes on the particular corresponding execution unit.

13. The method according to claim 1, further comprising:
storing, for each thread of a plurality of threads, a hazard counter, a number of hazard counters is one for each hazard for each thread;
increasing, for each thread, a value of the hazard counter when a particular hazard is hit for the thread and the scheduler does not pick the thread;
comparing, for each thread, the value of the hazard counter to a hazard predetermined threshold; and
blocking, by the scheduler, other threads until the thread corresponding to the value of the hazard counter that is equal to or greater than the hazard predetermined threshold is picked.

14. The method according to claim 13, further comprising:
clearing the value of the hazard counter when the thread is picked by the scheduler.

15. A floating point unit, comprising:
a register file that stores instructions, operands used by the instructions, and results of executed instructions;
a decode, translate, and rename circuit that receive instructions that are to be executed and decodes the instructions, performs address translations, and performs register renaming for instructions;
a scheduler that stores the instructions until they are eligible to be selected by the scheduler to issue to at least one execution unit; and
a plurality of execution units that execute the instructions scheduled by the scheduler, the at least one execution unit being an execution unit of the plurality of execution units,
wherein floating point unit comprises hardware control logic operative to:
store for each thread, by the scheduler of the floating point unit, at least one counter,
increase, by the scheduler, a value of the at least one counter for each thread having at least one source ready operation exist for the thread;
compare, by the scheduler, the value of the at least one counter for each thread to a predetermined threshold; and
make other threads ineligible to be picked by the scheduler when the value of the at least one counter for each thread is greater than or equal to the predetermined threshold.

16. The floating point unit according to claim 15, wherein the value of the at least one counter increases when the thread waits for at least one hazard to resolve prior to execution, and the least one hazard includes one or more of a port sharing hazard, a shadow select sharing hazard, and a data path resource sharing hazard.

17. The floating point unit according to claim 15, wherein when a plurality of counters, each counter corresponding to a corresponding thread of a plurality of threads, have values that are equal to or greater than the predetermined threshold, each thread having a corresponding value of the counter equal to or greater than the predetermined threshold, the scheduler makes other threads ineligible to be picked by the scheduler, and wherein the scheduler processes the threads having a corresponding value of the counter equal to or greater than the predetermined threshold based on one of i) a time in which the counter became equal to or greater than the predetermined threshold and ii) a preset priority between threads.

18. A processing system, comprising:
a processor;
a bus coupled to the processor;
a memory coupled to the processor via the bus; and
a floating point unit coupled to the processor via the bus, wherein floating point unit comprises hardware control logic operative to:
store for each thread, by a scheduler of the floating point unit, at least one counter,
increase, by the scheduler, a value of the at least one counter corresponding to a thread that has at least one source ready operation exist for the thread;
compare, by the scheduler, the value of the at least one counter for each thread to a predetermined threshold; and
make other threads ineligible to be picked by the scheduler when the value of the at least one counter for each thread is greater than or equal to the predetermined threshold.

19. The system according to claim 18, wherein the value of the at least one counter increases when the thread waits for at least one hazard to resolve prior to execution, and the least one hazard includes one or more of a port sharing hazard, a shadow select sharing hazard, and a data path resource sharing hazard.

20. The system according to claim 18, wherein when a plurality of counters, each counter corresponding to a corresponding thread of a plurality of threads, have values that are equal to or greater than the predetermined threshold, each thread having a corresponding counter equal to or greater than the predetermined threshold, the scheduler makes other threads ineligible to be picked by the scheduler, and wherein the scheduler processes the threads having a corresponding counter equal to or greater than the predetermined threshold based on one of i) a time in which the counter became equal to or greater than the predetermined threshold and ii) a preset priority between threads.

21. The system according to claim 18, wherein the processor comprises a graphics processing unit and the graphics processing unit is operatively coupled to the floating point unit and wherein the thread is associated with the graphics processing unit.

* * * * *